Nov. 8, 1960 D. I. KOSOWSKY 2,959,752

SELECTIVE LOW DISTORTION CRYSTAL FILTER

Filed March 25, 1959

Inventor
David I. Kosowsky
by Robert S. Toperzer
Atty.

United States Patent Office 2,959,752

Patented Nov. 8, 1960

2,959,752

SELECTIVE LOW DISTORTION CRYSTAL FILTER

David I. Kosowsky, Medford, Mass., assignor to Hycon Eastern, Inc., Cambridge, Mass., a corporation of Delaware Filed Mar. 25, 1959, Ser. No. 801,907

3 Claims. (Cl. 333—72)

Figure 1:
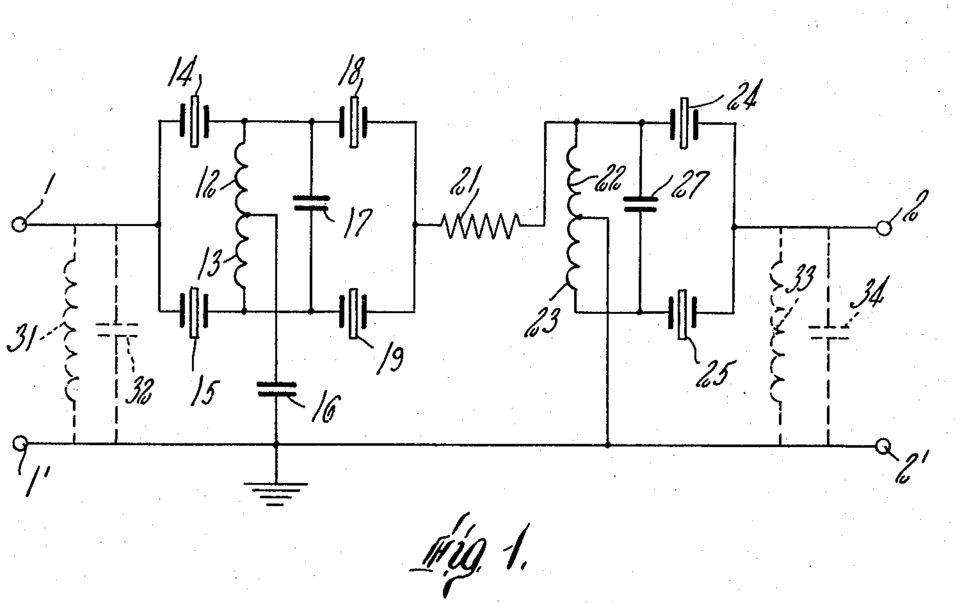

This invention relates to frequency selective filters for radio waves and in particular it is concerned with band pass filter networks which embody piezoelectric elements.

In addition to its band width and attenuation, there are certain other aspects of a band pass crystal filter that usually must be taken into account. One of these is shape factor which is the ratio of the band width at 60 decibels (db) of attenuation to the band width at 6 decibels (db) attenuation. The lower is the shape factor, the steeper are the sides of the "notch" in the attenuation characteristic where the pass band is located. Another important aspect is the amount of ripple that is present, that is the extent to which the attenuation characteristic fluctuates, in the pass band region. Such ripple is undesirable because it is reflected in distortion of the signal transmitted by the filter. Still another factor to be reckoned with is the presence of discontinuities in the attenuation characteristic outside the pass band which are caused by spurious modes of oscillation of the filter crystals. As it is usually impossible or, at any rate, impractical to eliminate altogether such spurious modes of oscillation, the problem is to minimize them and especially to avoid coaction between crystals such as will make their effect more aggravated.

A two-section band pass filter of lattice configuration or the hybrid equivalent thereof normally has a shape factor of about 3.5 to 1. This value is sufficiently small for many applications but a more common requirement is for shape factors of two to one or less. Usually a filter of this kind provides sufficient protection against spurious modes so that attenuations of 50 decibels or more can be realized everywhere outside the pass band. However, many applications of band pass crystal filters require considerably more attenuation than this. A most desirable feature of such a two-section filter is that the amount of attenuation which takes place in the pass band remains relatively constant. Specifically, the ripple is less than ±½ db, which, in most applications, is small enough so that the amount of distortion resulting therefrom can be easily tolerated.

One way to obtain a better shape factor is to provide a parallel arrangement of two or more crystals in each arm of the filter. Shape factors of better than 1.5 to 1 can be produced in this way without materially increasing the amount of ripple that is present in the pass band. This does not, however, eliminate the attenuation minimums that exist at frequencies far removed from the pass band due to the effect of spurious modes. It also requires crystals with widely different characteristics.

Through the use of two additional filter sections, both a more desirable shape factor and a higher minimum value of attenuation outside the pass band can be realized. However, to add on the additional two filter sections, a resistive pad must be employed or otherwise the pass band will exhibit violent ripples. The pad, of course, materially increases the insertion loss or power dissipation in the filter. Instead of the pad, an active network including a vacuum tube or transistor can be used, but for obvious reasons this is to be avoided wherever possible. In any case, a disadvantage of the four-section filter is that the amount of ripple present in the pass band is close to ±1 db at best, which is more than can be tolerated in many applications.

Therefore, it is an object of the present invention to provide a band pass crystal filter having an attenuation characteristic wherein the pass band region exhibits a relatively low shape factor, and is sufficiently uniform for most all filter applications, and there is uniformly high attenuation everywhere outside the pass band.

A further object is to adapt such a filter for use in applications where the required width of the pass band is not always the same and may vary over a relatively wide range.

Still another object is to provide a band pass crystal filter of the above-mentioned character which employs a minimum number of components, especially crystals.

A still further object is to provide a band pass crystal filter of the above-mentioned character which incorporates crystals having very nearly the same characteristics.

The novel features of the invention together with further objects and advantages thereof will become apparent from the following detailed description and the drawing to which it refers.

Figure 2:
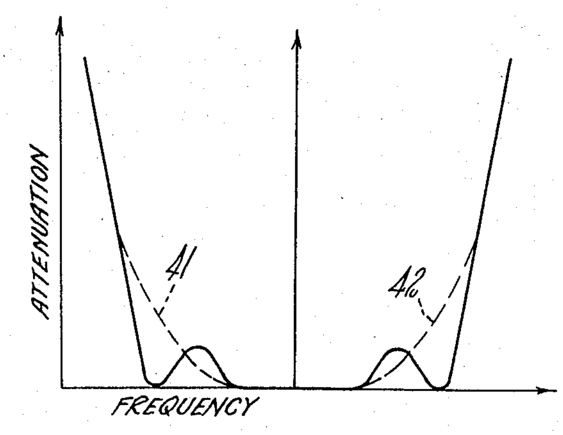

In the drawing:

Fig. 1 is a schematic diagram of a band pass crystal filter according to the invention; and Fig. 2 is a graph illustrating the attenuation characteristic of the filter of Fig. 1.

With reference now to the drawing, it will be observed that the numerals 1, 1' designate the input terminals to the filter, and the numerals 2, 2' designate the output terminals. Terminals 1' and 2' are connected in common, the network being of the unbalanced type. Incorporated in the first two sections of the filter is a hybrid transformer having a pair of balanced windings 12 and 13. One end of the winding 12 is connected to terminal 1 through a crystal 14. Similarly, one end of winding 13 is connected to terminal 1' through a crystal 15. The other ends of the windings are connected in common to a capacitor 16 whereby coupling is provided to the grounded terminals of the filter, namely terminals 1' and 2'. Another capacitor 17 is connected across the remote ends of the windings for purposes to be explained.

The second stage of the filter comprises crystals 18 and 19. These are disposed in series relation to one another and in parallel relation to the capacitor 17 with which they are directly connected. The junction of the crystals 18 and 19 is connected to a resistor 21 whereby coupling is provided to the final section of the filter. This section incorporates a hybrid transformer having a pair of balanced windings 22 and 23, and a pair of crystals 24 and 25. One end of winding 22 is connected to the resistor 21, and its other end is connected in common with one end of winding 23. The common ends of the windings are grounded. Connected across the remote winding ends is a capacitor 27. Crystals 24 and 25 are interposed between the output terminal 2 and the remote ends of the windings 22 and 23, respectively.

There is also shown in dotted outline an inductor 31 and a capacitor 32 connected across the input terminals, and an inductor 33 and capacitor 34 connected across the output terminals. These are to represent a modification of the filter network according to the invention and their function will be described more in detail hereinafter.

In the most basic form of the filter according to the invention, crystal 14 is tuned to resonance at the lower end of the pass band, and crystal 15 is tuned to resonance approximately at the pass band center. The upper end of the pass band is defined by the anti-resonant frequency of crystal 15. Crystals 18 and 24 are tuned in substantially the same manner as crystal 14, while crystals 19 and 25 are tuned in substantially the same manner as crystal 15. The capacitor 16 is adapted to neutralize the effect of the virtual inductances produced by the leakage inductances of the hybrid windings 12 and 13 and is assigned a value $C=4\pi^2 f_0^2 L_1$ where $f_0$ is the center frequency in the pass band and $L_1$ represents the value of the virtual inductances. It will be appreciated, however, that with a hybrid transformer having unusually small leakage, it may be possible to forego the use of a capacitor such as capacitor 16 which has been done in the case of windings 22, 23. In the latter case, the need for such a capacitor is not so great anyway because only a single filter section isolated by resistor 21 is involved. Capacitor 17, on the other hand, is adapted to neutralize, that is resonate with, the coupled inductances of the windings 12 and 13, while the capacitor 27 does the same for the windings 22 and 23. My copending application Serial No. 595,179 filed July 2, 1956 contains a more detailed explanation of the undesirable effects of the leakage and coupled inductances of the hybrid windings and how the capacitors function to avoid them. What is significant according to the present invention is the use of one and only one resistor for interstage coupling.

As shown in Fig. 2, there is a significant rise in the amount of attenuation present in the pass band that occurs adjacent to the lower end thereof. I have found, however, that with a resistor 21, approximately one-fifth as large as the characteristic impedance Rg of the filter, as may be determined according to well known principles, this hump or ripple can be substantially eliminated. This is shown by the dotted line 41 in Fig. 2. It is to be noted also that there is a hump in the attenuation characteristic located at the upper end of the pass band. This is not appreciably affected by the resistor. Instead I have found that this hump can be eliminated by appropriate adjustment of the quality factor Q of the hybrid windings. Specifically, if the Q of the hybrid windings is made equal to $$\frac{40Rg}{2\pi f_0 L}$$

(L=coupled inductance of each winding), this upper hump or ripple in the attenuation characteristic can be eliminated, as shown by the dotted curve 42. Another way of specifying the requisite value for the Q of the hybrid windings is that the effective resistances of the windings should be approximately forty times the characteristic impedance of the filter network.

In a modified form of the filter according to the invention, inductor 31 and capacitor 32 coact with the crystals 14 and 15 to produce anti-resonant frequencies or poles different from those that are produced by the crystals alone. The use of such an inductor-capacitor combination is described in detail in my copending application Serial No. 638,506 filed February 6, 1957. In brief, inductor 31 and capacitor 32, although connected across the input terminals, may be regarded as being connected across both crystal A and crystal B. By proper choice of the values of capacitor 32 and inductor 31, two anti-resonant conditions or poles are created with each crystal. One of these poles is caused to be located a substantial distance away, frequencywise, from the resonant frequencies or zeros associated with the crystals, while the other poles in combination with the zeros define marginal portions of the pass band, respectively. The overall effect is to extend the band width of the filter. As in the case of the simple narrow band configuration, the second and third filter sections are adapted to have substantially the same zero-pole configuration as the first. Inductor 33 and capacitor 34 are provided for this purpose with respect to the third section, as will be apparent to those skilled in the art. It should be noted, however, that there is no additional inductor and capacitor to coact with the crystals 18 and 19. Instead I have found that this function can be served by the coupled inductances of the hybrid windings 22 and 23 together with capacitor 27, when the second and third sections are intercoupled according to the invention.

Various other modifications that are within the spirit and scope of the invention will no doubt occur to those skilled in the art and, therefore, the invention should not be deemed to be limited to the details of what has been described herein by way of example. Rather, it should be deemed to be limited only to the combination as claimed.

What is claimed is:

1. A crystal filter network comprising a pair of input terminals and a pair of output terminals, one of said input terminals being connected in common with one of said output terminals, a first hybrid transformer having a pair of balanced windings, said windings having two common ends and two remote ends, a pair of piezoelectric elements connected from the remote ends of said first pair of hybrid windings to the other of said input terminals, respectively, each of said piezoelectric elements having a resonant frequency and an anti-resonant frequency defining marginal portions of the filter pass band, means to interconnect the common ends of said first pair of hybrid windings and the common terminals of the network, a first capacitor connected across the remote ends of said first pair of hybrid windings to neutralize the effect of the coupled inductances of said windings, a second pair of piezoelectric elements having respective connections to the remote ends of said first pair of hybrid windings and a common connection to one another, said second pair of piezoelectric elements having substantially the same characteristics as said first pair of piezoelectric elements, a second hybrid transformer having a pair of balanced windings, said windings having a pair of common ends and a pair of remote ends, a resistor connected between one of said remote ends and the common connection of said second pair of piezoelectric elements, means to interconnect the common ends of said second pair of hybrid windings and the common terminals of the network, a second capacitor connected across the remote ends of said second pair of hybrid windings to neutralize the effect of the coupled inductances of said second pair of windings, and a third pair of piezoelectric elements having respective connections to the remote ends of said second pair of hybrid windings and a common connection to the other of said output terminals, said third pair of piezoelectric elements having substantially the same characteristics as said first and second pair of piezoelectric elements.

2. A crystal filter network according to claim 1 wherein said resistance has a value equal to approximately one-fifth the characteristic impedance of the filter network, and the effective resistance of each of said hybrid windings is approximately forty times the characteristic impedance of the filter network.

3. A crystal filter network according to claim 2 including an inductor and a capacitor connected across said input terminals to produce in combination with each of said first pair of piezoelectric elements a pair of anti-resonant conditions at frequencies displaced from the crystal resonant frequencies by substantially different amounts, one of said anti-resonant frequencies being located outside the filter pass band, and an inductor and capacitor connected across said output terminals to produce in combination with each of said third pair of piezoelectric elements anti-resonant conditions at frequencies displaced from the crystal resonant frequency by substantially different amounts, one of said anti-resonant frequencies being likewise located outside the filter pass band.

References Cited in the file of this patent

UNITED STATES PATENTS

| | | |
|---|---|---|
| 2,029,014 | Bode | Jan. 28, 1936 |
| 2,266,658 | Robinson | Dec. 16, 1941 |

FOREIGN PATENTS

| | | |
|---|---|---|
| 539,444 | Great Britain | Sept. 10, 1941 |

OTHER REFERENCES

Kosowsky: "High Frequency Crystal Filter Design Techniques and Applications." Proceedings of the IRE vol. 46, No. 2, February 1958, pages 419–429.